United States Patent
Chen

(10) Patent No.: US 7,333,548 B2
(45) Date of Patent: Feb. 19, 2008

(54) PHASE AND FREQUENCY DRIFT COMPENSATION IN ORTHOGONAL FREQUENCY DIVISION MULTIPLEXING SYSTEMS

(75) Inventor: Hung-Kun Chen, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 786 days.

(21) Appl. No.: 10/705,520

(22) Filed: Nov. 10, 2003

(65) Prior Publication Data

US 2005/0100106 A1 May 12, 2005

(51) Int. Cl.
*H04K 1/10* (2006.01)
*H04L 27/28* (2006.01)
(52) U.S. Cl. .................. 375/260; 375/326; 375/327; 375/354; 375/362
(58) Field of Classification Search ................. 375/260, 375/326, 327, 354, 362
See application file for complete search history.

(56) References Cited

U.S. PATENT DOCUMENTS 5,970,397 A * 10/1999 Klank et al. ................. 455/139
6,807,241 B1 * 10/2004 Milbar et al. ................ 375/343
7,009,932 B2 * 3/2006 Matheus et al. ............. 370/208

OTHER PUBLICATIONS

Carrier frequency acquisition and tracking for OFDM systems, Luise, M.; Reggiannini, R.; Communications, IEEE Transactions on vol. 44, Issue 11, Nov. 1996 pp. 1590-1598, Digital Object Identifier 10.1109/26.544476 □□.*
"Optimum receiver design for wireless broad-band systems using OFDM—Part I", Speth, M.; Fechtel, S.A.; Fock, G.; Meyr, H.; Communications, IEEE Transactions on vol. 47, Issue 11, Nov. 1999 pp. 1668-1677.*
"Optimum receiver design for OFDM-based broadband transmission—part II: A case study", Speth, M.; Fechtel, S.; Fock, G.; Meyr, H.; Communications, IEEE Transactions on vol. 49, Issue 4, Apr. 2001 pp. 571-578 1.*

* cited by examiner

*Primary Examiner*—Ted Wang
(74) *Attorney, Agent, or Firm*—Thomas, Kayden, Horstemeyer & Risley

(57) ABSTRACT

A phase drift compensation scheme for multi-carrier systems. According to the invention, a timing offset compensator is provided to compensate for a timing offset in a current symbol after taking an N-point FFT. Then a phase estimator computes a phase estimate for the current symbol based on a function of a channel response of each pilot subcarrier, transmitted data on each pilot subcarrier, and a timing compensated version of the current symbol on the pilot subcarrier locations. From the phase estimate, a tracking unit can generate a phase tracking value for the current symbol. Thereafter, a phase compensator uses the phase tracking value to compensate the timing compensated version of the current symbol for the effect of phase drift.

17 Claims, 2 Drawing Sheets

PHASE AND FREQUENCY DRIFT COMPENSATION IN ORTHOGONAL FREQUENCY DIVISION MULTIPLEXING SYSTEMS

BACKGROUND OF THE INVENTION

1. Field of the Invention

The invention relates to digital communication systems, and more particularly to a robust phase/frequency drift compensation scheme for Orthogonal Frequency Division Multiplexing (OFDM) systems.

2. Description of the Related Art

With the rapidly growing demand for cellular, mobile radio and other wireless transmission services, there has been an increasing interest in exploiting various technologies to provide reliable, secure, and efficient wireless communications. Orthogonal Frequency Division Multiplexing (OFDM) is well known as a highly spectral efficient transmission scheme capable of dealing-with severe channel impairment encountered in a mobile environment. OFDM was previously adopted for wireless local area network (WLAN) applications as part of the IEEE 802.11a standard in the 5 GHz frequency band. Furthermore, the IEEE 802.11g standard approved in June of 2003 also adopted OFDM as a mandatory part for a further high-speed physical layer (PHY) extension to the 802.11b standard in the 2.4 GHz band.

The basic idea of OFDM is to divide the available spectrum into several sub-channels (subcarriers). By making all sub-channels narrowband, they experience almost flat fading, which makes equalization very simple. In order to obtain high spectral efficiency, the frequency responses of the sub-channels are overlapping and orthogonal. This orthogonality can be completely maintained by introducing a guard interval, even though the signal passes through a time-dispersive channel. A guard interval is a copy of the last part of an OFDM symbol which is pre-appended to the transmitted symbol. This plays a decisive role in avoiding inter-symbol and inter-carrier interference.

OFDM can largely eliminate the effects of inter-symbol interference (ISI) for high-speed transmission in highly dispersive channels by separating a single high speed bit stream into a multiplicity of much lower speed bit streams each modulating a different subcarrier. However, OFDM is known to be vulnerable to synchronization errors due to the narrow spacing between subcarriers. The most important difficulty when implementing OFDM systems is that of achieving timing, phase and frequency synchronization between the transmitter and the receiver. In general, mismatch between transmitter and receiver oscillators contributes a non-zero carrier frequency offset in a received OFDM signal. Transient behavior of the frequency synthesizer is another source of the frequency offset. OFDM signals are very susceptible to frequency offset which causes a loss of orthogonality between the OFDM subcarriers and results in inter-carrier interference (ICI) and bit error rate (BER) deterioration of the receiver. On the other hand, phase noise arising from oscillators also introduces ICI. In addition, both frequency offset and phase noise cause phase variation so that phase tracking is required for coherent detection. Unlike the frequency offset and phase noise, as stated above, timing errors may incur inter-symbol interference (ISI) in addition to ICI. If the exact timing of the beginning of each symbol is not known, the receiver cannot reliably remove the guard interval and correctly acquire individual symbols before computing the Fast Fourier Transform (FFT) of their samples. In this case, inter-symbol interference occurs. Moreover, even a small time-domain misalignment of the FFT window results in an evolving phase shift in the frequency-domain symbols, leading to BER degradation. Yet another issue of concern is the difference between the sampling rate of the receiver and that of the transmitter. This sampling rate offset results in a rotation of the $2^m$-ary constellation from symbol to symbol.

Many techniques dealing with the frequency offset estimation have been previously proposed for OFDM systems. Nevertheless, fewer works lend themselves readily to timing and phase compensation suitable for integrated circuit implementation. In order to achieve rapid acquisition and accurate tracking, there is a need to particularly address the phase drift in the lock transient of local oscillators.

SUMMARY OF THE INVENTION

It is an object of the present invention to provide an apparatus for rapidly acquiring and continuously tracking the phase of OFDM signals at the receiving end.

It is another object of the present invention to provide a robust phase/frequency drift compensation scheme for multi-carrier systems such as OFDM receivers, which is well-suited to integrated circuit implementation.

The present invention is generally directed to a phase and frequency drift compensation apparatus for multi-carrier systems. According to one aspect of the invention, a phase and frequency tracking apparatus for multi-carrier systems is disclosed. The apparatus of the invention includes an mth-order tracking loop, a frequency predictor, and a pre-DFT synchronizer. From a number of loop parameters and a phase estimate of a current symbol, the mth-order tracking loop computes a phase tracking value, a normalized frequency tracking value and a normalized acceleration tracking value for the current symbol. The frequency predictor then calculates a feedback compensation frequency for a next symbol based on an equivalent feedback delay, the normalized frequency tracking value and the normalized acceleration tracking value of the current symbol. Prior to taking an N-point Discrete Fourier Transform (DFT), the pre-DFT synchronizer is able to compensate the phase and frequency of a received signal in the time domain using the feedback compensation frequency.

According to another aspect of the invention, a phase tracking apparatus for multi-carrier systems is proposed. The phase tracking apparatus is constituted by an mth-order tracking loop and a frequency predictor. From a number of loop parameters and a phase estimate of a current symbol, the mth-order tracking loop computes a phase tracking value, a normalized frequency tracking value and a normalized acceleration tracking value for the current symbol. The phase tracking value can be employed to compensate for the effect of phase drift. The frequency predictor calculates as output a feedback compensation frequency for a next symbol based on an equivalent feedback delay, the normalized frequency tracking value and the normalized acceleration tracking value of the current symbol. Using the feedback compensation frequency, pre-DFT synchronization can be accomplished accordingly.

In a preferred embodiment of the invention, a phase and frequency drift compensation apparatus is composed of a timing offset compensator, a phase estimator, an mth-order tracking loop, a frequency predictor, a pre-DFT synchronized, and a phase compensator. The timing offset compensator receives a current symbol in the frequency domain after taking an N-point DFT and compensates for a timing offset in the current symbol. From the timing offset compensator, the phase estimator takes a timing compensated version of the current symbol on pilot subcarrier locations. Hence, a phase estimate is computed for the current symbol based on a function of a channel response of each pilot subcarrier, transmitted data on each pilot subcarrier, and the timing compensated version of the current symbol on the pilot subcarrier locations. From a number of loop parameters and the phase estimate of the current symbol, the mth-order tracking loop computes a phase tracking value, a normalized frequency tracking value and a normalized acceleration tracking value for the current symbol. The frequency predictor calculates a feedback compensation frequency for a next symbol based on an equivalent feedback delay, the normalized frequency tracking value and the normalized acceleration tracking value of the current symbol. Prior to taking the N-point DFT, the pre-DFT synchronizer compensates the phase and frequency of a received signal in the time domain using the feedback compensation frequency. With the phase tracking value, the phase compensator can compensate the timing compensated version of the current symbol for the effect of phase drift.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
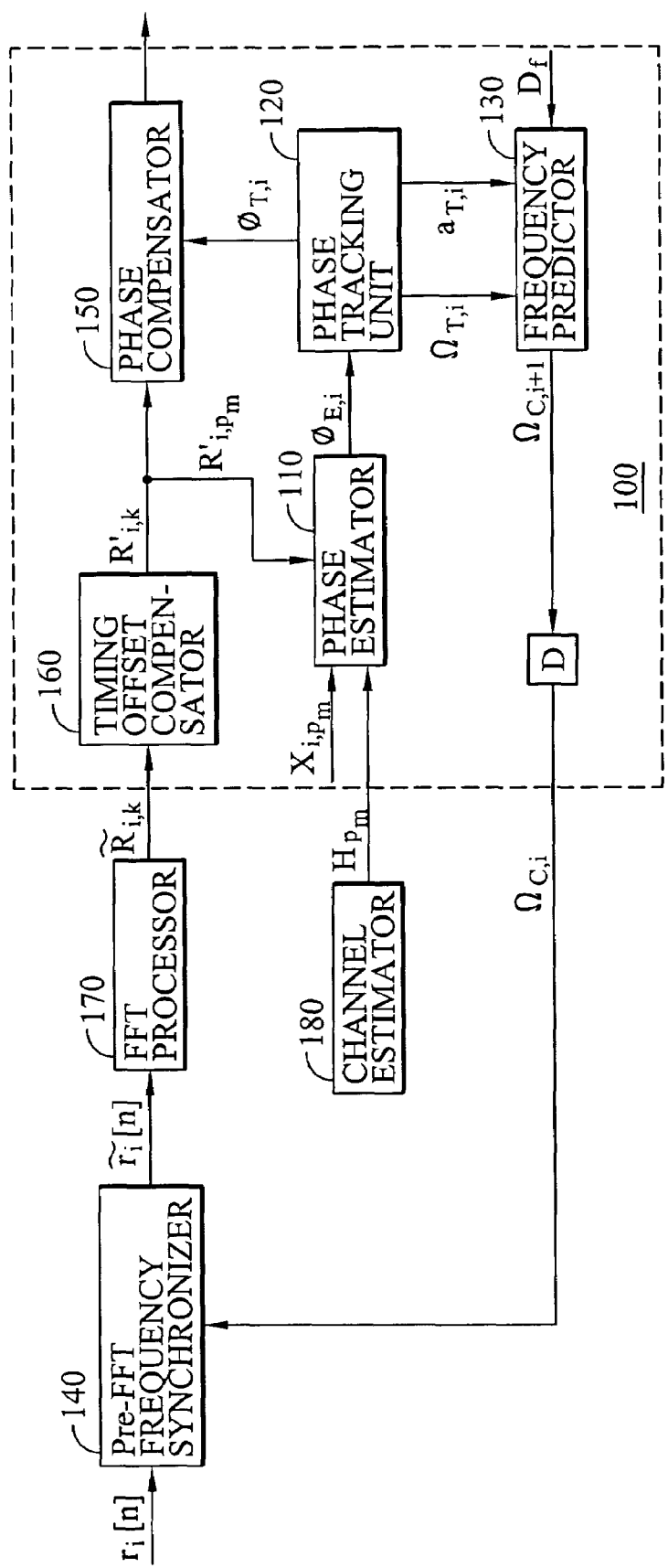
FIG. 1 is a block diagram of a preferred embodiment according to the invention.

The present invention will now be described in the context of the use of OFDM for communication, although the present invention is not limited to OFDM. The present invention is also described with reference to a wireless communication system that conforms to the IEEE 802.11a/g standard. According to the invention, the communication system need not be wireless and the conformant 802.11a/g transceiver referred to herein is merely an exemplary illustration.

In a conformant 802.11a/g system, an OFDM symbol is modulated onto a number of subcarriers by applying an N-point Inverse Fast Fourier Transform (FFT) with N=64. At the receiving end, the demodulation can be accomplished by means of an N-point FFT. Ignoring the ICI noise term, the output of FFT is described by $$R_{i,k} = H_k X_{i,k} e^{j\phi_i} e^{-j2\pi \frac{k\Delta t_i}{T}} + N_{i,k}$$

and $$\phi_i = \Omega \cdot i + \phi_0, \quad \Omega = 2\pi f_\epsilon T'$$

where
i denotes the OFDM symbol index,
k denotes the subcarrier index,
$X_{i,k}$ is complex-valued data transmitted on subcarrier k of the ith OFDM symbol,
$H_k$ is the channel response of subcarrier k,
$N_{i,k}$ is the frequency-domain representation of additive white Gaussian noise (AWGN) at the kth subcarrier during the ith OFDM symbol,
T is the FFT period,
$\Delta t_i$ is the timing offset with respect to the FFT period during the ith OFDM symbol,
T' is the symbol interval (including the guard interval),
$f_\epsilon$ is the residual frequency error due to the initial frequency offset estimation,
$\phi_0$ is the initial phase drift, and
$\phi_i$ is the equivalent phase offset of the ith OFDM symbol.

Note that the noise term, $N_{i,k}$, is iid (identically, independently distributed) over different symbols and subcarriers. From the above signal model, the phase and timing offsets both result in additional phase shifts. It is evident that phase offset contributes the same phase shift to all subcarriers.

Denoting the pilot subcarrier index by $p_m$, the conditional joint probability density function of those pilot tones of the ith symbol given $\phi_i$, $\Delta t_i$, $H_k$ and $X_{i,k}$, for $k=p_m$, is given by:

$$g(R_{i,p_1}, R_{i,p_2}, \cdots, R_{i,p_{N_{SP}}} | \phi_i, \Delta t_i, H_k, X_{i,k}) =$$

$$\left(\frac{1}{\sqrt{2\pi\sigma_N^2}}\right)^{N_{SP}} \exp\left(-\frac{1}{2\sigma_N^2} \sum_{m=1}^{N_{SP}} \left|R_{i,p_m} - H_{p_m} X_{i,p_m} e^{j\phi_i} e^{-j2\pi \frac{p_m \Delta t_i}{T}}\right|^2\right)$$

where
$\sigma_N^2$ denotes the noise variance per subcarrier and
$\sigma_N^2 = E\{|N_{i,k}|^2\}$,
$R_{i,p_m}$ denotes the ith received OFDM symbol on pilot subcarrier location $p_m$, and
$N_{SP}$ is the number of pilot subcarriers.

Therefore, a pilot-aided estimation is derived from this is function using the maximum-likelihood (ML) principle as follows:

$$\phi_{E,i} = \arg\max_{\phi_i} g(R_{i,p_1}, R_{i,p_2}, \cdots, R_{i,p_{N_{SP}}} | \phi_i, \Delta t_i, H_k, X_{i,k})$$

$$= \arg\max_{\phi_i} \left(-\sum_{m=1}^{N_{SP}} \left|R_{i,p_m} - H_{p_m} X_{i,p_m} e^{j\phi_i} e^{-j2\pi \frac{p_m \Delta t_i}{T}}\right|^2\right)$$

$$= \arg\max_{\phi_i} \sum_{m=1}^{N_{SP}} \left[2\text{Re}\left\{R_{i,p_m}\left(H_{p_m} X_{i,p_m} e^{j\phi_i} e^{-j2\pi \frac{p_m \Delta t_i}{T}}\right)^*\right\} - |R_{i,p_m}|^2 - |H_{p_m} X_{i,p_m}|^2\right]$$

$$= \arg\max_{\phi_i} \sum_{m=1}^{N_{SP}} \text{Re}\left\{R_{i,p_m}\left(H_{p_m} X_{i,p_m} e^{j\phi_i} e^{-j2\pi \frac{p_m \Delta t_i}{T}}\right)^*\right\}$$

$$= \arg\max_{\phi_i} \text{Re}\left\{e^{-j\phi_i} \sum_{m=1}^{N_{SP}} \left(R_{i,p_m} e^{j2\pi \frac{p_m \Delta t_i}{T}}\right)(H_{p_m} X_{i,p_m})^*\right\}$$

Thus, a phase estimate of the ith symbol, $\phi_{E,i}$, is given by:

$$\phi_{E,i} = \text{angle}\left(\sum_{m=1}^{N_{SP}} \left(R_{i,p_m} e^{j2\pi \frac{p_m \Delta t_i}{T}}\right)(H_{p_m} X_{i,p_m})^*\right) \quad (1)$$

$$= \text{angle}\left(\sum_{m=1}^{N_{SP}} R'_{i,p_m} (H_{p_m} X_{i,p_m})^*\right)$$

where $R'_{i,p_m}$, a timing compensated version of the ith received OFDM symbol on pilot subcarrier location $p_m$, is defined by:

$$R'_{i,p_m} = R_{i,p_m} e^{j2\pi \frac{p_m \Delta t_i}{T}}$$

Note that superscript * herein denotes complex conjugation.

According to the invention, a third-order tracking loop is employed to follow the transmitter's behavior during the lock transient and continuously track the phase of OFDM signals. The tracking loop is modeled with a set of recursive equations by:

$$\phi_{T,i} = \phi_{P,i} + \mu_{\phi,i} \phi_{\epsilon,i}$$

$$a_{T,i} = \Omega_{P,i} + \mu_{f,i} \phi_{\epsilon,i}$$

$$a_{T,i} = a_{T,i-1} + \mu_{a,i} \phi_{\epsilon,i} \quad (2)$$

and $$\phi_{P,i+1} = \phi_{T,i} + \Omega_{T,i}$$

$$\Omega_{P,i+1} = \Omega_{T,i} + a_{T,i} \quad (3)$$

where
- $\phi_{T,i}$, $\Omega_{T,i}$ and $a_{T,i}$ denote phase, normalized frequency and normalized acceleration tracking values of the ith symbol, respectively,
- $\mu_{\phi,i}$, $\mu_{f,i}$ and $\mu_{a,i}$ denote loop parameters of the ith symbol for updates of $\phi_{T,i}$, $\Omega_{T,i}$ and $a_{T,i}$, respectively,
- $\phi_{P,i}$ and $\Omega_{P,i}$ denote phase and normalized frequency prediction values of the ith symbol, respectively,
- $\phi_{P,i+1}$ and $\Omega_{P,i+1}$ are the phase and the normalized frequency prediction values of symbol i+1,
- $a_{T,i-1}$ is the normalized acceleration tracking value of symbol i−1, and $\phi_{\epsilon,i}$, a phase prediction error of the ith symbol, is defined by:

$$\phi_{\epsilon,i} = \phi_{E,i} - \phi_{P,i} \quad (4)$$

where $\phi_{E,i}$ is the phase estimate given by equation (1). Here variables or parameters with subscript i refer to the current symbol and those subscripted with i+1 refer to the next symbol. On the other hand, variables or parameters with subscript i−1 indicate that they are associated with the preceding symbol. The index of i=0 represents the first symbol to be tracked in the tracking loop, which is the SIGNAL symbol in IEEE 802.11a. Initial values of recursive equations (2) and (3) are indexed with i=−1. In the case of phase tracking, all the initial values are equal to zero:

$$\phi_{T,-1} = \Omega_{T,-1} = a_{T,-1} = 0$$

Furthermore, the tracking of frequency and acceleration should skip the first symbol. Thus, $\mu_{f,0} = \mu_{a,0} = 0$.

Typically, the pre-FFT synchronization is addressed only through the initial estimation of frequency offset. However, the frequency may drift away from its initial value later. Once this happens, the inter-carrier interference occurs. Therefore, the output of the post-FFT tracking loop is provided as feedback and used to compensate for the frequency deviation before taking the FFT. To this end, two issues must be considered. First, the feedback of frequency will impact the third-order tracking loop described earlier and change the overall loop response. Second, it is necessary to deal with the feedback delay between the pre-FFT synchronization and post-FFT tracking.

For the ith OFDM symbol, the pre-FFT sequence can be shown to have the form:

$$r_i[n] = \frac{1}{N} \sum_{k=0}^{N-1} R_{i,k} e^{j2\pi \frac{k}{N} n}, \quad 0 \leq n \leq N-1$$

Assuming that $r_i[n]$ is compensated by an additional frequency $\omega$, the pre-FFT sequence becomes $$\tilde{r}_i[n] = r_i[n] e^{-j\omega n}, \quad 0 \leq n \leq N-1$$

Due to the further compensation, the FFT output is rewritten as:

$$\tilde{R}_{i,k} = \sum_{n=0}^{N-1} \tilde{r}_i[n] e^{-j2\pi \frac{k}{N} n}$$

$$= \sum_{n=0}^{N-1} r_i[n] e^{-j\omega n} e^{-j2\pi \frac{k}{N} n} \quad , \quad 0 \leq n \leq N-1$$

$$= \sum_{n=0}^{N-1} \frac{1}{N} \sum_{l=0}^{N-1} R_{i,l} e^{j2\pi \frac{l}{N} n} e^{-j\omega n} e^{-j2\pi \frac{k}{N} n}$$

Ignoring the ICI noise term, a useful result is given for l=k as follows:

$$\tilde{R}_{i,k} \approx R_{i,k} \frac{1}{N} \sum_{n=0}^{N-1} e^{-j\omega n}$$

$$= R_{i,k} e^{-j[\omega(N-1)/2]} \frac{1}{N} \frac{\sin(\omega N/2)}{\sin(\omega/2)}$$

For small $\omega$, the slight variation of magnitude can be neglected. Nonetheless, the phase drift will enter the post-FFT tracking loop and cause the overall loop response to deviate from the original design. This undesirable drift is cancelled out by de-rotating $\tilde{r}_i[n]$ by a controlled phase $\theta$:

$$\tilde{r}_i[n] = r_i[n] e^{-j(\omega n + \theta)}, \quad 0 \leq n \leq N-1$$

where $$\theta = -\omega(N-1)/2$$

The underlying delay between the pre-FFT compensation and post-FFT tracking should be taken into account when the compensation frequency $\omega$ is derived from the output of the third-order tracking loop, $\Omega_{T,i}$. Preferably, the frequency $\omega$ is computed from $\Omega_{C,i}$, a feedback compensation frequency of symbol i, by:

$$\omega = \Omega_{C,i}/N'$$

and $\Omega_{C,i-1}$, the feedback compensation frequency of symbol i+1, is predicted with an equation of the form:

$$\Omega_{C,i+1} = \Omega_{T,i} + D_f a_{T,i} \quad (5)$$

where $D_f$ is a numerical representation of the equivalent feedback delay in symbols and N' is the number of samples in the symbol interval T'. Thus, equation (4) can be recast into:

$$\tilde{r}_i[n] = r_i[n]\, e^{j\Omega_{C,i}\frac{(N-1)-2n}{2N}}, \quad 0 \le n \le N-1 \qquad (6)$$

where n is the sample index, $r_i[n]$ is the received signal of sample n of symbol i before taking an N-point FFT. While the FFT is mentioned in the above discussion, it should be clear to those skilled in the art that the Discrete Fourier Transform (DFT) is also applicable to the present invention since the FFT is an efficient scheme for computing the DFT. Therefore, DFT and FFT are herein interchangeable terms according to the principles of the invention.

In light of the foregoing description, the present invention will now be explained from an embodiment of FIG. 1. As depicted, a received signal $r_i[n]$ in the time domain is subjected to phase de-rotation and frequency compensation by a pre-FFT (pre-DFT) frequency synchronizer 140 before entering the subsequent FFT (DFT) processor 170. In this regard, the received signal $r_i[n]$ is compensated with a feedback compensation frequency $\Omega_{C,i}$ according to equation (6). The FFT (DFT) processor 170 accepts the compensated signal $\tilde{r}_i[n]$ at its input and applies an N-point FFT (DFT) to transform $\tilde{r}_i[n]$ from the time domain to the frequency domain. The FFT (DFT) output $\tilde{R}_{i,k}$ is then fed to a phase drift compensation apparatus of the invention. The phase drift compensation apparatus 100 includes a phase estimator 110, a phase tracking unit 120, a frequency predictor 130, a phase compensator 150 and a timing offset compensator 160. The timing offset compensator 160 receives a current symbol, $\tilde{R}_{i,k}$, from the FFT (DFT) processor 170 and compensates $\tilde{R}_{i,k}$ for the effect of timing offset. After that, the phase estimator 110 takes $R'_{i,p_m}$, a timing compensated version of the current symbol on pilot subcarrier locations $p_m$ where $m=1,\ldots,N_{SP}$. In addition, the phase estimator 110 also takes known data $X_{i,p_m}$ that are transmitted on pilot subcarriers of the current symbol. A channel estimator 180 is used to estimate the channel response of each subcarrier, $H_k$. Only $H_{p_m}$, $m=1,\ldots,N_{SP}$, the channel responses of pilot subcarriers are provided to the phase estimator 110. As a result, the phase estimator 110 calculates a phase estimate $\phi_{E,i}$ for the current symbol with equation (1).

Figure 2:
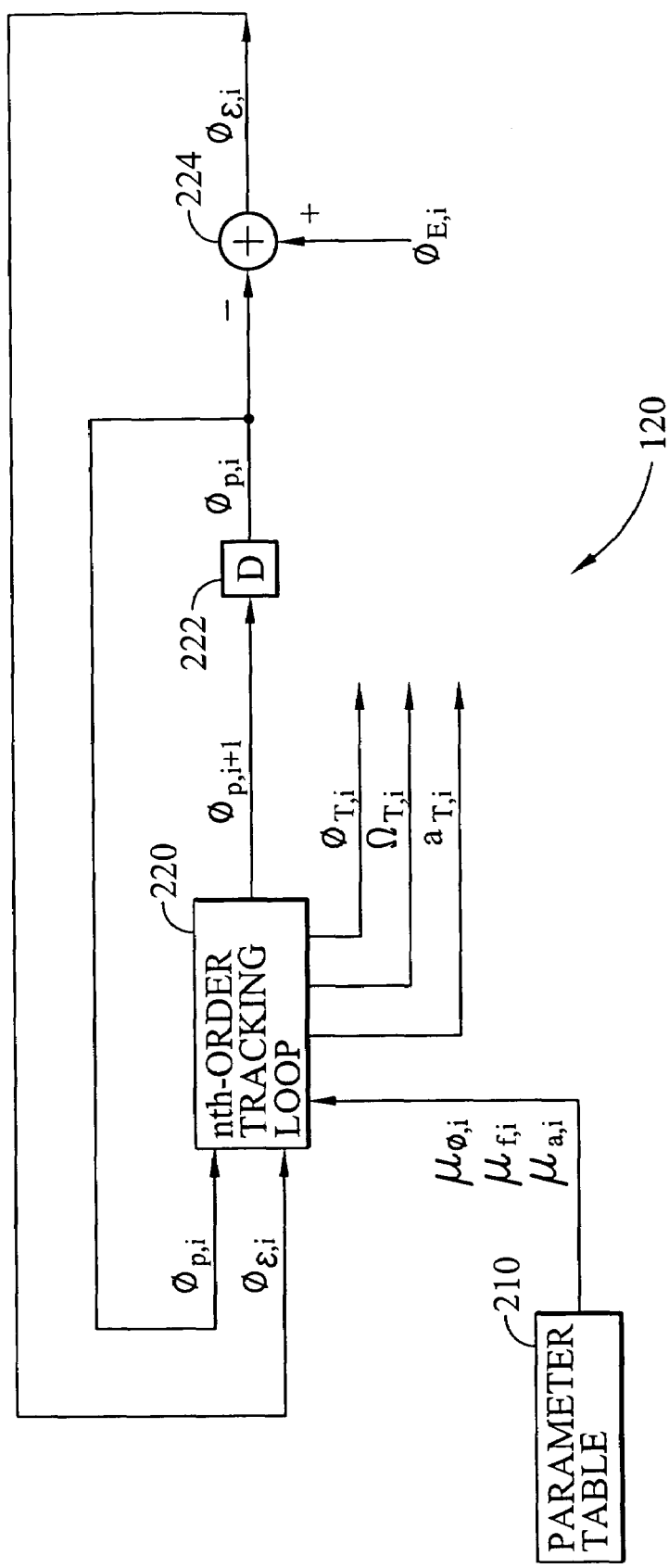
FIG. 2 is a detailed block diagram of a phase tracking unit according to the invention.

The phase tracking unit 120 is designed to generate a phase tracking value, $\phi_{T,i}$, for the current symbol based on the phase estimate $\phi_{E,i}$. Referring to FIG. 2, a block diagram of the phase tracking unit 120 is illustrated. The phase tracking unit 120 is constituted by a parameter table 210, an mth-order tracking loop 220, a D flip-flop 222, and a subtractor 224. The parameter table 210 is configured to store a number of loop parameters. The mth-order tracking loop 220 computes the phase tracking value $\phi_{T,i}$, a normalized frequency tracking value $\Omega_{T,i}$ and a normalized acceleration tracking value $a_{T,i}$ for the current symbol based on the phase estimate $\phi_{E,i}$ and the loop parameters $\mu_{\phi,i}$, $\mu_{f,i}$ and $\mu_{a,i}$ that are retrieved from the parameter table 210 for the current symbol. In one embodiment, the mth-order tracking loop 220 is a third-order tracking loop modeled with the above-described equations (2) and (3). From equation (3), the mth-order tracking loop 220 also generates a phase prediction value $\phi_{P,i+1}$ for a next symbol. This phase prediction value $\phi_{P,i+1}$ is subjected to an appropriate delay by the D flip-flop 222 thereby yielding $\phi_{P,i}$, the phase prediction value of the current symbol. The output of the D flip-flop 222 is supplied to the subtractor 224 where a phase prediction error $\phi_{\epsilon,i}$ is calculated for the current symbol from equation (4). Then, $\phi_{P,i}$ and $\phi_{\epsilon,i}$ are fed back to the mth-order tracking loop 220 for next tracking.

Referring again to FIG. 1, the phase tracking unit 120 supplies the phase tracking value $\phi_{T,i}$ to the phase compensator 150 where a timing compensated version of the current symbol, $R'_{i,k}$, is compensated for the effect of phase drift. On the other hand, the frequency predictor 130 is provided with the normalized frequency tracking value $\Omega_{T,i}$, the normalized acceleration tracking value $a_{T,i}$, and a numerical representation of the equivalent feedback delay $D_f$. Accordingly, the frequency predictor 130 can predict a feedback compensation frequency $\Omega_{C,i+1}$ for the next symbol with equation (5). The prediction output $\Omega_{C,i+1}$ is fed to a D flip-flop 132 and the feedback compensation frequency $\Omega_{C,i}$ is thereby generated for a currently received symbol. As a result, the pre-FFT (pre-DFT) synchronization can be accomplished on the basis of $\Omega_{C,i}$ by the pre-FFT (pre-DFT) frequency synchronizer 140. In view of the above, the apparatus of the invention really addresses the phase drift in the lock transient of local oscillators. Therefore, the present invention provides a robust scheme to rapidly acquire and continuously track the phase of OFDM signals.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A phase and frequency tracking apparatus for multicarrier systems, comprising:
   an mth-order tracking loop for computing a phase tracking value, a normalized frequency tracking value and a normalized acceleration tracking value for a current symbol based on a phase estimate of said current symbol and a plurality of loop parameters;
   a frequency predictor for calculating as output a feedback compensation frequency for a next symbol based on an equivalent feedback delay, said normalized frequency tracking value and said normalized acceleration tracking value of said current symbol; and
   a pre-DFT synchronizer for compensating the phase and frequency of a received signal in a time domain using said feedback compensation frequency before taking an N-point Discrete Fourier Transform (DFT).

2. The apparatus as recited in claim 1 wherein said mth-order tracking loop is a third-order tracking loop modeled with a set of recursive equations, as follows:

$$\phi_{T,i} = \phi_{P,i} + \mu_{\phi,i}\phi_{\epsilon,i}$$

$$\Omega_{T,i} = \Omega_{P,i} + \mu_{f,i}\phi_{\epsilon,i}$$

$$a_{T,i} = a_{T,i-1} + \mu_{a,i}\phi_{\epsilon,i}$$

and $$\phi_{P,i+1} = \phi_{T,i} + \Omega_{T,i}$$

$$\Omega_{P,i+1} = \Omega_{T,i} + a_{T,i}$$

where
   subscript i denotes a symbol index,
   $\phi_{T,i}$, $\Omega_{T,i}$ and $a_{T,i}$ respectively denote said phase, said normalized frequency and said normalized acceleration tracking values of symbol i, $\mu_{\phi,i}$, $\mu_{f,i}$ and $\mu_{a,i}$ respectively denote said loop parameters of the ith symbol for $\phi_{T,i}$, $\Omega_{T,i}$ and $a_{T,i}$, $\phi_{P,i}$ and $\Omega_{P,i}$ respectively denote a phase prediction value and a normalized frequency prediction value of the ith symbol, $\phi_{P,i+1}$ and $\Omega_{P,i+1}$ are said phase and said normalized frequency prediction values of symbol i+1, $a_{T,i+1}$ is said normalized acceleration tracking value of symbol i−1, and $\phi_{\epsilon,i}$, a phase prediction error of the ith symbol, is given by:

$$\phi_{\epsilon,i} = \phi_{E,i} - \phi_{P,i}$$

where $\phi_{E,i}$ denotes said phase estimate of the ith symbol.

3. The apparatus as recited in claim 2 wherein initial values of said phase, said normalized frequency and said normalized acceleration tracking values, $\phi_{T,i}$, $\Omega_{T,i}$ and $a_{T,i}$, are set to zero, for i=−1; said loop parameters $\mu_{f,i}$ and $\mu_{a,i}$ are equal to zero, for i=0.

4. The apparatus as recited in claim 2 wherein said feedback compensation frequency is calculated for said next symbol from:

$$\Omega_{C,i+1} = \Omega_{T,i} + D_f a_{T,i}$$

where $D_f$ is a numerical representation of said equivalent feedback delay and $\Omega_{C,i+1}$ is said feedback compensation frequency of symbol i+1.

5. The apparatus as recited in claim 1 wherein said pre-DFT synchronizer receives said feedback compensation frequency of the ith symbol, $\Omega_{C,i}$, to compensate the frequency of said received signal and de-rotate the phase of said received signal in the time domain before taking the N-point DFT, by:

$$\tilde{r}_i[n] = r_i[n] e^{j\Omega_{C,i} \frac{(N-1)-2n}{2N'}}, \quad 0 \le n \le N-1$$

where n denotes a sample index, $r_i[n]$ denotes said received signal of sample n of symbol i, and N' is the number of samples in a symbol interval.

6. A phase and frequency tracking apparatus for multi-carrier systems, comprising:

an mth-order tracking loop for computing a phase tracking value, a normalized frequency tracking value and a normalized acceleration tracking value for a current symbol based on a phase estimate of said current symbol and a plurality of loop parameters, wherein said phase tracking value is employed to compensate for an effect of phase drift; and a frequency predictor for calculating as output a feedback compensation frequency for a next symbol based on an equivalent feedback delay, said normalized frequency tracking value and said normalized acceleration tracking value of said current symbol, whereby pre-DFT synchronization can be accomplished using said feedback compensation frequency.

7. The apparatus as recited in claim 6 wherein said phase estimate of said current symbol, $\phi_{E,i}$, is computed from the following function:

$$\phi_{E,i} = \text{angle}\left(\sum_{m=1}^{N_{SP}} R'_{i,p_m} (H_{p_m} X_{i,p_m})^*\right)$$

where superscript * denotes complex conjugation, subscript i denotes a symbol index, $N_{SP}$ is the number of the pilot subcarriers, subscript $p_m$ denotes a pilot subcarrier index, for m=1, ..., $N_{SP}$, $H_{p_m}$ denotes a channel response of pilot subcarrier $p_m$, $X_{i,p_m}$ denotes a transmitted data on pilot subcarrier $p_m$ of symbol i, $R'_{i,p_m}$ denotes a timing compensated version of the ith symbol on pilot subcarrier location $p_m$, and $\phi_{E,i}$ represents said phase estimate of the ith symbol.

8. The apparatus as recited in claim 6 wherein said mth-order tracking loop is a third-order tracking loop modeled with a set of recursive equations, as follows:

$$\phi_{T,i} = \phi_{P,i} + \mu_{\phi,i} \phi_{\epsilon,i}$$

$$\Omega_{T,i} = \Omega_{P,i} + \mu_{f,i} \phi_{\epsilon,i}$$

$$a_{T,i} = a_{T,i-1} + \mu_{a,i} \phi_{\epsilon,i}$$

and $$\phi_{P,i+1} = \phi_{T,i} + \Omega_{T,i}$$

$$\Omega_{P,i+1} = \Omega_{T,i} + a_{T,i}$$

where subscript i denotes a symbol index, $\phi_{T,i}$, $\Omega_{T,i}$ and $a_{T,i}$ respectively denote said phase, said normalized frequency and said normalized acceleration tracking values of symbol i, $\mu_{\phi,i}$, $\mu_{f,i}$ and $\mu_{a,i}$ respectively denote said loop parameters of the ith symbol for $\phi_{T,i}$, $\Omega_{T,i}$ and $a_{T,i}$, $\phi_{P,i}$ and $\Omega_{P,i}$ respectively denote a phase prediction value and a normalized frequency prediction value of the ith symbol, $\phi_{P,i+1}$ and $\Omega_{P,i+1}$ are said phase and said normalized frequency prediction values of symbol i+1, $a_{T,i-1}$ is said normalized acceleration tracking value of symbol i−1, and $\phi_{\epsilon,i}$, a phase prediction error of the ith symbol, is given by:

$$\phi_{\epsilon,i} = \phi_{E,i} - \phi_{P,i}$$

where $\phi_{E,i}$ denotes said phase estimate of the ith symbol.

9. The apparatus as recited in claim 8 wherein initial values of said phase, said normalized frequency and said normalized acceleration tracking values, $\phi_{T,i}$, $\Omega_{T,i}$ and $a_{T,i}$, are set to zero, for i=−1; said loop parameters $\mu_{f,i}$ and $\mu_{a,i}$ are equal to zero, for i=0.

10. The apparatus as recited in claim 8 wherein said feedback compensation frequency is calculated for said next symbol from:

$$\Omega_{C,i+1} = \Omega_{T,i} + D_f a_{T,i}$$

where $D_f$ is a numerical representation of said equivalent feedback delay and $\Omega_{C,i+1}$ is said feedback compensation frequency of symbol i+1.

11. The apparatus as recited in claim 6 wherein said feedback compensation frequency of the ith symbol, $\Omega_{C,i}$, is provided as feedback to de-rotate a received signal prior to taking the N-point DFT, by:

$$\tilde{r}_i[n] = r_i[n] e^{j\Omega_{C,i} \frac{(N-1)-2n}{2N'}}, \quad 0 \le n \le N-1$$

where n denotes a sample index, $r_i[n]$ denotes said received signal of sample n of symbol i, and N' is the number of samples in a symbol interval.

12. A phase and frequency drift compensation apparatus for multi-carrier systems, comprising:
 a timing offset compensator for receiving a current symbol in a frequency domain after taking an N-point Discrete Fourier Transform (DFT) and compensating for a timing offset in said current symbol;
 a phase estimator for taking a timing compensated version of said current symbol on pilot subcarrier locations and computing a phase estimate for said current symbol based on a function of a channel response of each pilot subcarrier, transmitted data on each pilot subcarrier, and said timing compensated version of said current symbol on said pilot subcarrier locations;
 an mth-order tracking loop for computing a phase tracking value, a normalized frequency tracking value and a normalized acceleration tracking value for said current symbol based on said phase estimate of said current symbol and a plurality of loop parameters;
 a frequency predictor for calculating as output a feedback compensation frequency for a next symbol based on an equivalent feedback delay, said normalized frequency tracking value and said normalized acceleration tracking value of said current symbol;
 a pre-DFT synchronizer for compensating the phase and frequency of a received signal in a time domain using said feedback compensation frequency before taking the N-point DFT; and
 a phase compensator for compensating said timing compensated version of said current symbol for an effect of phase drift with said phase tracking value of said current symbol.

13. The apparatus as recited in claim 12 wherein said mth-order tracking loop is a third-order tracking loop modeled with a set of recursive equations, as follows:

$$\phi_{T,i} = \phi_{P,i} + \mu_{\phi,i}\phi_{\epsilon,i}$$

$$\Omega_{T,i} = \Omega_{P,i} + \mu_{f,i}\phi_{\epsilon,i}$$

$$a_{T,i} = a_{T,i-1} + \mu_{a,i}\phi_{\epsilon,i}$$

and $$\phi_{P,i+1} = \phi_{T,i} + \Omega_{T,i}$$

$$\Omega_{P,i+1} = \Omega_{T,i} + a_{T,i}$$

where
 subscript i denotes a symbol index,
 $\phi_{T,i}$, $\Omega_{T,i}$ and $a_{T,i}$ respectively denote said phase, said normalized frequency and said normalized acceleration tracking values of symbol i,
 $\mu_{\phi,i}$, $\mu_{f,i}$ and $\mu_{a,i}$ respectively denote said loop parameters of the ith symbol for $\phi_{T,i}$, $\Omega_{T,i}$ and $a_{T,i}$,
 $\phi_{P,i}$ and $\Omega_{P,i}$ respectively denote a phase prediction value and a normalized frequency prediction value of the ith symbol,
 $\phi_{P,i+1}$ and $\Omega_{P,i+1}$ are said phase and said normalized frequency prediction values of symbol i+1,
 $a_{T,i+1}$ is said normalized acceleration tracking value of symbol i−1,
and $\phi_{\epsilon,i}$, a phase prediction error of the ith symbol, is given by:

$$\phi_{\epsilon,i} = \phi_{E,i} - \phi_{P,i}$$

where $\phi_{E,i}$ denotes said phase estimate of the ith symbol.

14. The apparatus as recited in claim 13 wherein initial values of said phase, said normalized frequency and said normalized acceleration tracking values, $\phi_{T,i}$, $\Omega_{T,i}$ and $a_{T,i}$, are set to zero, for i=−1; said loop parameters $\mu_{f,i}$ and $\mu_{a,i}$ are equal to zero, for i=0.

15. The apparatus as recited in claim 13 wherein said feedback compensation frequency is calculated for said next symbol from:

$$\Omega_{C,i+1} = \Omega_{T,i} + D_f a_{T,i}$$

where $D_f$ is a numerical representation of said equivalent feedback delay and $\Omega_{C,i+1}$ is said feedback compensation frequency of symbol i+1.

16. The apparatus as recited in claim 12 wherein said pre-DFT synchronizer receives said feedback compensation frequency of the ith symbol, $\Omega_{C,i}$, to compensate the frequency of said received signal and de-rotate the phase of said received signal in the time domain before taking the N-point DFT, by:

$$\tilde{r}_i[n] = r_i[n] e^{j\Omega_{C,i} \frac{(N-1)-2n}{2N'}}, \quad 0 \leq n \leq N-1$$

where n denotes a sample index, $r_i[n]$ denotes said received signal of sample n of symbol i, and N' is the number of samples in a symbol interval.

17. The apparatus as recited in claim 12 wherein said phase estimator computes said phase estimate of said current symbol, $\phi_{E,i}$, by means of the following function:

$$\phi_{E,i} = \text{angle}\left(\sum_{m=1}^{N_{SP}} R'_{i,p_m} (H_{p_m} X_{i,p_m})^*\right)$$

where
 superscript * denotes complex conjugation,
 subscript i denotes a symbol index,
 $N_{SP}$ is the number of the pilot subcarriers,
 subscript $p_m$ denotes a pilot subcarrier index, for m=1, . . . , $N_{SP}$,
 $H_{p_m}$ denotes said channel response of pilot subcarrier $p_m$,
 $X_{i,p_m}$ denotes said transmitted data on pilot subcarrier $p_m$ of symbol i,
 $R'_{i,p_m}$ denotes said timing compensated version of the ith symbol on pilot subcarrier location $p_m$, and
 $\phi_{E,i}$ represents said phase estimate of the ith symbol.

* * * * *